W. V. TURNER.
FLUID PRESSURE BRAKE DEVICE.
APPLICATION FILED APR. 22, 1913.
1,082,296.
Patented Dec. 23, 1913.
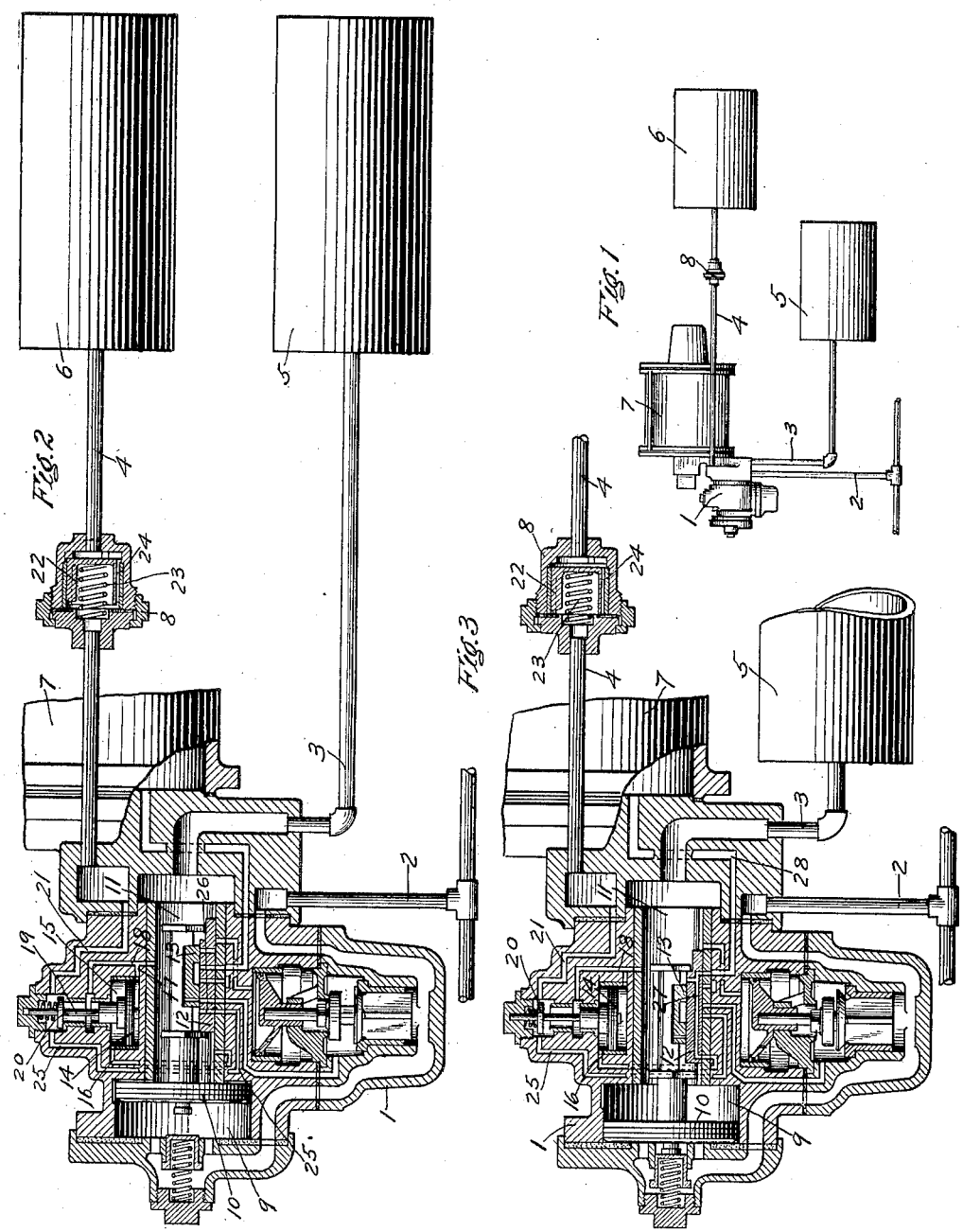
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,082,296.  Specification of Letters Patent.  Patented Dec. 23, 1913.

Application filed April 22, 1913.  Serial No. 762,865.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Devices, of which the following is a specification.

This invention relates to fluid pressure brakes, and more particularly to a device for automatically cutting off communication from the emergency reservoir under certain conditions.

In certain types of air brake apparatus now frequently employed in service, a reservoir in addition to the usual auxiliary reservoir is provided and fluid from this reservoir is employed to secure a high pressure in an emergency application of the brakes and also for other purposes such as graduating the release of the brakes.

Where a vehicle is equipped with an apparatus of the above described character, it is sometimes desirable to cut out the additional reservoir so far as supplying fluid in an emergency application of the brakes is concerned, for example, when the vehicle so equipped is temporarily employed in a train in which there are vehicles not provided with the high pressure emergency feature. In such cases, however, it is desirable to retain the use of the additional reservoir for its other purposes, such as for graduating the release of the brakes.

The principal object of my invention is to provide means for automatically cutting out the additional reservoir in an emergency application of the brakes while retaining the same in service for other purposes.

In the accompanying drawing, Figure 1 is a diagrammatic view of a car air brake equipment, showing my improvement applied thereto; Fig. 2 a central sectional view of a triple valve device connected to the usual auxiliary reservoir and an additional reservoir and showing the automatic cut-out device in section, the triple valve device being shown in release position; and Fig. 3 a similar view, showing the positions of the parts when an emergency application of the brakes is made.

As shown in Fig. 1 of the drawing, the car air brake equipment comprises a brake cylinder 7, a triple valve device 1, connected to the train pipe 2, and by pipes 3 and 4 to the auxiliary reservoir 5 and the additional reservoir 6 respectively, and according to my invention, an automatic cut out device 8 is inserted in the additional reservoir pipe 4. The triple valve device 1 has the usual piston chamber 9 connected to train pipe 2 and containing piston 10 and valve chamber 11 connected by pipe 3 to auxiliary reservoir 5 and containing the main slide valve 12 and auxiliary or graduating valve 13, both adapted to be operated by the piston 10 in the usual manner. For controlling the admission of fluid from the additional reservoir 6 to the brake cylinder, a by-pass valve device is provided comprising a piston 14 contained in piston chamber 15, the space on one side of the piston being connected to a passage 16, leading to the seat of the main slide valve 12 and the space at the opposite side of the piston being connected to the valve chamber 11 by passages 17 and 18. The piston 14 is connected by a valve stem 19 to a valve 20 which controls communication from a passage 21, open to the additional reservoir pipe 4, to passage 18 leading to the valve chamber 11.

As so far described, the construction corresponds with that heretofore employed, but according to my invention, a cut-out valve device 8 is inserted in the additional reservoir pipe 4. This valve device preferably comprises a valve piston 22 for controlling communication through pipe 4 from the additional reservoir to the triple valve device and adapted, when moved toward the triple valve device, to seat and cut off said communication.

The valve piston is subject to the pressure of a spring 23 tending to hold the valve piston off its seat and a passage 24 provides a restricted communication from the reservoir to the triple valve device when the valve piston is unseated.

The operation of my improvement depends upon the fact that in an emergency application of the brakes the flow of air from the additional reservoir is large and sudden while for other operations, such as graduating the release of the brakes, the flow is more gradual. When the brake system is charged in the usual manner, fluid is supplied to the additional reservoir from valve chamber 11, through port 26 in the main slide valve, passage 25, passage 21, pipe 4 and the restricted passage 24 around the valve piston 22. In graduating the release of the brakes, upon movement of the parts to release position, the port 26 registers with the passage 25, so that fluid from the additional reservoir 6 is supplied to the valve chamber 11 and the auxiliary reservoir and when the pressure in the auxiliary reservoir has been increased by this flow to a degree slightly exceeding the train pipe pressure, the piston 10 is moved outwardly and the graduating valve 13 is shifted to close the port 26. The rate of flow from the additional reservoir sufficient for graduated release is provided for by the restricted passage 24, so that the fluid pressure on opposite sides of the valve piston 22 remain substantially balanced and no movement of the valve piston takes place. If an emergency application of the brakes is made, the triple valve parts assume emergency position, as shown in Fig. 3 of the drawing, in which passage 16 is connected by cavity 27 with brake cylinder passage 28. The fluid pressure above the by-pass piston 14 is thus reduced and the auxiliary reservoir pressure acting on the opposite side of the piston moves the piston and the valve 20 is lifted from its seat, establishing communication from the additional reservoir passage 21 to passage 18, leading to valve chamber 11 and the auxiliary reservoir. The larger passages employed in emergency position for supplying fluid to the brake cylinder cause a rate of flow from the additional reservoir exceeding that which can be taken care of by the restricted passage 24 and consequently, the fluid pressure on the reservoir side of the valve piston 22 quickly becomes greater than the fluid pressure on the triple valve side of the valve piston, so that the valve piston is shifted to its seat, cutting off communication from the reservoir to the triple valve device. It will now be evident that by employing my improvement, the additional reservoir is automatically cut off in an emergency application of the brakes while the same is available for graduated release and the like.

My invention is not limited to use with a triple valve device, as the same may be applied to other forms of brake controlling valve devices where an additional reservoir is employed and where it is desired to provide means for cutting the reservoir out of action in making emergency applications of the brakes.

Having now described my invention, what I claim as new and desire to secure by Letters Patent, is:—

1. In a fluid pressure brake, the combination with a reservoir and a valve device for controlling the supply of fluid to effect an application of the brakes and provided with means for opening communication from said reservoir upon an emergency application of the brakes and also at other times, of a valve mechanism operated by the flow of fluid from said reservoir for cutting off communication from the reservoir to said valve device in an emergency application of the brakes.

2. In a fluid pressure brake, the combination with a brake cylinder, train pipe, auxiliary reservoir, and a valve device operating upon a reduction in train pipe pressure for supplying fluid from the auxiliary reservoir to the brake cylinder, of an additional reservoir, means controlled by said valve device for opening communication from said additional reservoir in an emergency application of the brakes and for effecting a graduated release of the brakes, and a valve mechanism operated by the flow of fluid from said additional reservoir in an emergency application of the brakes for closing communication from the additional reservoir to said valve device.

3. In a fluid pressure brake, the combination with a brake cylinder, a train pipe, a reservoir, a valve device operating upon a gradual reduction in train pipe pressure for effecting the supply of fluid from said reservoir to the brake cylinder, an additional reservoir, means controlled by said valve device for supplying fluid from said additional reservoir to the brake cylinder upon a sudden reduction in train pipe pressure, and means controlled by said valve device for supplying fluid from said additional reservoir to effect a graduated release of the brakes, of a valve mechanism operated by the flow of fluid from said additional reservoir for closing communication from the additional reservoir to said valve device upon an emergency application of the brakes and having means for permitting flow of fluid from the additional reservoir in effecting a graduated release of the brakes.

4. In a fluid pressure brake, the combination with a valve device having means for effecting an application of the brakes, of a reservoir connected to said valve device and a valve mechanism for controlling communication from said reservoir to said valve device and operated at a predetermined rate of flow from the reservoir to the valve device for closing communication from the reservoir to said valve device.

5. In a fluid pressure brake, the combination with a valve device having means for effecting an application of the brakes, of a reservoir connected to said valve device and a valve mechanism for controlling communication from said reservoir to said valve device and adapted to permit a gradual flow of fluid from the reservoir, said valve mechanism being operated by a predetermined greater rate of flow for closing communication from the reservoir to said valve device.

6. In a fluid pressure brake, the combination with a reservoir and a valve device operated by variations in train pipe pressure for controlling the application and release of the brakes and provided with means for establishing a flow of fluid from the reservoir to effect a gradual release of the brakes and a more rapid flow to effect an emergency application of the brakes, of a valve mechanism controlling communication through which fluid is supplied from said reservoir and operated by the more rapid flow for closing said communication.

7. In a fluid pressure brake, the combination with a reservoir and a valve device for controlling the brakes and provided with means for utilizing fluid from said reservoir for braking purposes, of a valve piston for controlling communication from the reservoir to said valve device and having a restricted passage for permitting a limited rate of flow from the reservoir, said valve piston being operated by a greater rate of flow for closing communication from the reservoir to said valve device.

In testimony whereof I have hereunto set my hand.

WALTER V. TURNER.

Witnesses:
A. M. CLEMENTS,
C. A. ALLSHOUSE.